United States Patent
Bleile et al.

(10) Patent No.: US 8,196,569 B2
(45) Date of Patent: Jun. 12, 2012

(54) METHOD FOR OPERATING AN INTERNAL COMBUSTION ENGINE HAVING EXHAUST GAS RECIRCULATION

(75) Inventors: Thomas Bleile, Stuttgart (DE); Horst Mueller, Nordheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/070,998

(22) Filed: Feb. 22, 2008

(65) Prior Publication Data

US 2008/0276914 A1 Nov. 13, 2008

(30) Foreign Application Priority Data

Feb. 28, 2007 (DE) .......................... 10 2007 009 689

(51) Int. Cl.
*F02B 47/08* (2006.01)
*F02M 25/07* (2006.01)
*G06F 19/00* (2011.01)

(52) U.S. Cl. .............. 123/568.16; 123/568.11; 701/108; 701/114; 73/114.74

(58) Field of Classification Search ............. 123/568.11, 123/568.15, 568.16, 568.22; 701/101, 102, 701/108, 114; 60/605.2; 73/114.74
See application file for complete search history.

(56) References Cited

U.S. PATENT DOCUMENTS

| | | | |
|---|---|---|---|
| 6,393,345 B1 * | 5/2002 | Kerns et al. ...................... 701/34 |
| 6,842,690 B2 * | 1/2005 | Akao et al. ..................... 701/114 |
| 6,850,834 B1 * | 2/2005 | Yu et al. ......................... 701/108 |
| 6,959,254 B2 * | 10/2005 | Reuschenbach et al. ...... 702/100 |
| 7,174,713 B2 * | 2/2007 | Nitzke et al. .................. 60/605.2 |
| 7,565,901 B2 * | 7/2009 | Furuta et al. .............. 123/568.16 |
| 2002/0124838 A1 * | 9/2002 | Wild et al. ................. 123/568.16 |
| 2002/0169573 A1 * | 11/2002 | Reuschenbach et al. ...... 702/100 |
| 2003/0029233 A1 * | 2/2003 | Ting et al. ..................... 73/118.1 |
| 2003/0225506 A1 * | 12/2003 | Plote et al. ..................... 701/114 |
| 2004/0187853 A1 * | 9/2004 | Ries-Mueller ........... 123/568.16 |
| 2008/0022677 A1 * | 1/2008 | Barbe et al. ..................... 60/599 |

FOREIGN PATENT DOCUMENTS

DE 10 2005 004 319 8/2006

OTHER PUBLICATIONS

Machine Translation of DE102005004319.*

* cited by examiner

*Primary Examiner* — Willis Wolfe, Jr.
*Assistant Examiner* — Anthony L Bacon
(74) *Attorney, Agent, or Firm* — Kenyon & Kenyon LLP

(57) ABSTRACT

In a method for operating an internal combustion engine having exhaust gas recirculation, air is supplied to at least one combustion chamber via an intake manifold at least partially closable with the aid of a final control element, and a part of the exhaust gases flowing into an exhaust pipe is conducted via an EGR channel, which is at least partially closable with the aid of an EGR valve unit, into an area of the intake manifold, which lies between the final control element and the combustion chamber. A first variable, which characterizes the mass flow of the gas conducted through the EGR channel, is ascertained from a set of state variables of the internal combustion engine, which apply for an operating state in which the engine is in overrun operation and the final control element is essentially closed.

12 Claims, 3 Drawing Sheets

Figure 1:
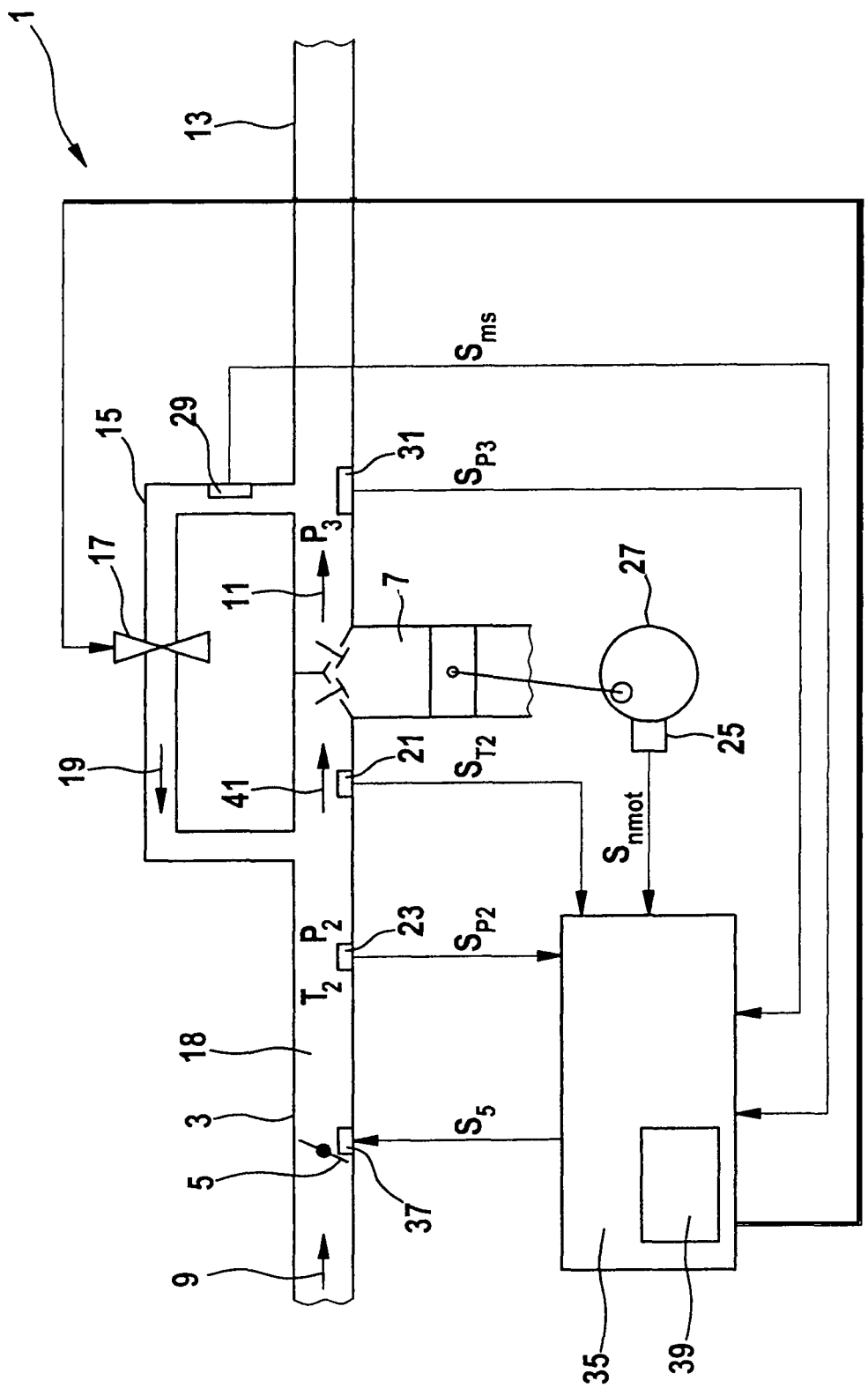

METHOD FOR OPERATING AN INTERNAL COMBUSTION ENGINE HAVING EXHAUST GAS RECIRCULATION

BACKGROUND OF THE INVENTION

1. Field of the Invention

The present invention relates to a method and a control unit for operating an internal combustion engine having exhaust gas recirculation, in which the air is supplied, via an intake manifold at least partially closable with the aid of a final control element, to at least one combustion chamber and a part of the exhaust gases flowing in an exhaust pipe is conducted via an EGR channel, which is at least partially closable with the aid of an EGR valve unit, into an area of the intake manifold which lies between the final control element and the combustion chamber.

2. Description of Related Art

A method for determining the air mass flow in internal combustion engines is known from published German patent document DE 10 2005 004 319, which ascertains the air mass flow in an intake manifold in that it not only detects a measured variable of an air mass sensor, but rather also ascertains the air mass flow using state variables, in particular a pressure before an engine intake, an air temperature before the engine intake, and an engine speed using the so-called "pTn method" (using thermodynamic state variables. In this method, the value detected with the aid of the air mass sensor is weighted less and less in relation to the value ascertained from the state variables with increasing operating time. The method for determining the air mass flow in the intake manifold is thus adapted to the aging and imprecision of the air mass sensor accompanying the increasing operating time of the internal combustion engine.

A BRIEF SUMMARY OF THE INVENTION

An object of the present invention is to provide a method for operating an internal combustion engine having exhaust gas recirculation, using which more reliable and lower-emission operation of the internal combustion engine is achieved over the entire operating time of the internal combustion engine.

In the implementation of the method according to the present invention, in particular in internal combustion engines which have a long operating time, the first variable, which characterizes the mass flow of the gas conducted through the EGR channel (EGR mass flow), is determined more precisely than in known methods. Changes of the EGR system caused by the operating time, which are to be attributed in particular to the accumulation of particles contained in the exhaust gases in the EGR system ("sooting up" of the EGR system), may thus be recognized and taken into consideration during operation of the internal combustion engine having exhaust gas recirculation. In this way, internal combustion engines having exhaust gas recirculation may be operated reliably and with low emissions over their entire operating time. A basic idea of the present invention is that the fresh air mass flow goes to zero when the final control element is closed. The first variable may thus be ascertained in a simple and reliable manner using known thermodynamic relationships. The first variable may be the mass flow itself or, for example, a dimensionless corresponding variable.

It is preferable for this purpose that the set of state variables includes a speed of the internal combustion engine and a gas temperature and a pressure in the intake manifold between the final control element and the combustion chamber. It is typical for the speed and the pressure to be measured, while the gas temperature may be measured or modeled. In this way, the first variable, which characterizes the EGR mass flow, may be ascertained in a particularly simple manner with the aid of the known pTn method, because the calculated mass flow corresponds to the EGR mass flow as a result of the closed final control element.

It may be provided that in the operating state in which the internal combustion engine is in overrun operation, a second variable, which characterizes the mass flow of the gas conducted through the EGR channel, may be detected using a sensor, and the first and second variables may be compared to one another. In this way, a variable characterizing the mass flow of the gas conducted through the EGR channel may also be detected when the internal combustion engine is not in overrun operation. This is because the second variable which is detected using the sensor is available in every operating state of the internal combustion engine. The mass flow of the gas conducted through the EGR channel may thus always be detected, not only in the special case of overrun operation; the value applicable for overrun operation of the second variable must only be used for the comparison. An aging-related change of the properties of the sensor (aging-related sensor drift) may be recognized by the comparison. The second variable may be the mass flow itself or, for example, a corresponding dimensionless variable or a signal value.

It is preferable for this purpose for the second variable to be corrected on the basis of the first variable. In this way, the aging-related sensor drift may be compensated for and the second variable may be ascertained with higher precision than up to this point in particular in internal combustion engines which have a long operating time.

It is particularly advantageous that an action is triggered if the absolute value of the difference between the first variable and the second variable reaches or exceeds a threshold value. Functional impairment of the sensor, which is possibly also only imminent, may thus be recognized and addressed in a suitable manner, in that, for example, the functional impairment of the sensor is indicated to the driver and/or the lack of availability of the second variable is taken into consideration during operation of the internal combustion engine.

It may be further provided that a variable characterizing the flow resistance of the EGR channel may be ascertained using the first variable and a variable which characterizes the difference between a pressure in the exhaust pipe and a pressure in the intake manifold in the area between the final control element and the combustion chamber. For example, the variable characterizing the flow resistance will increase or decrease the EGR mass flow when the EGR channel "soots up." This knowledge of the current state of the EGR channel may be used for optimized employment of the exhaust gas recirculation. The variable may also be the pressure differential and/or the flow resistance itself or, for example, a corresponding dimensionless variable here.

It is preferable for the EGR valve unit to be set in such a way that it has a specific degree of opening to ascertain the variable characterizing the flow resistance of the EGR channel. In this way, the flow resistance of the EGR channel may be ascertained with a completely opened EGR valve unit, for example, without taking the influence of the EGR valve unit into consideration. In this procedure, the EGR mass flow is comparatively high, which improves the precision of the ascertained result. When the EGR valve unit is not completely opened, the flow resistance of the EGR channel may be ascertained at a specific degree of opening of the EGR valve unit.

It may thus be provided that a variable characterizing the flow resistance of the EGR channel may be ascertained repeatedly at different degrees of opening of the EGR valve unit. Thus, multiple intermediate positions of the EGR valve unit may be approached and the flow resistance of the EGR channel may be ascertained at different degrees of opening of the EGR valve unit, which more or less allows the preparation of a current "characteristic curve." A function check of the EGR valve unit is also possible in this way.

It is preferable for the pressure in the exhaust pipe to be estimated on the basis of the atmospheric pressure or detected on the basis of a pressure sensor situated in the exhaust pipe. In this way, on the one hand no further means have to be provided for an estimation of the pressure in the exhaust pipe to detect or ascertain the pressure at the intake of the EGR channel, so that the method according to the present invention may be performed in a particularly cost-effective manner. On the other hand, if the pressure is detected on the basis of the pressure sensor situated in the exhaust pipe, particularly precise ascertainment of the variable which characterizes the pressure at the intake of the EGR channel is possible, so that particularly reliable and low-emission operation of the internal combustion engine is possible.

It may be further provided that at least one parameter of a model of a model-based regulator and/or a controller of the air system of the internal combustion engine and/or at least one parameter of a controller of the EGR valve unit may be adapted using the variable characterizing the flow resistance of the EGR channel. In this way it is achieved that the aging-related change of the properties of the EGR channel is taken into consideration in the regulator/controller of the air system. Moreover, aging effects of the EGR channel and/or the EGR valve unit are compensated for, in that the behavior of the controller of the EGR valve unit is adapted according to these aging effects. The dynamics of the regulator may be improved in particular in this way with a model-based regulator of the air system.

A control and/or regulating unit for an internal combustion engine, which is distinguished in that it is programmed to apply the method according to the present invention, is suggested as a further achievement of the above-mentioned object. In this way, the method according to the present invention may be performed automatically.

A BRIEF DESCRIPTION OF THE SEVERAL VIEWS OF THE DRAWING

Figure 2:
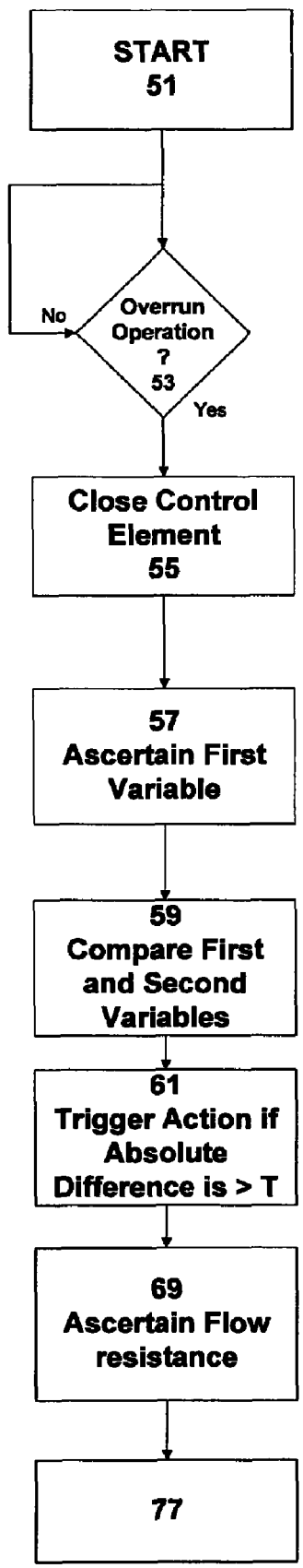
Figure 3:
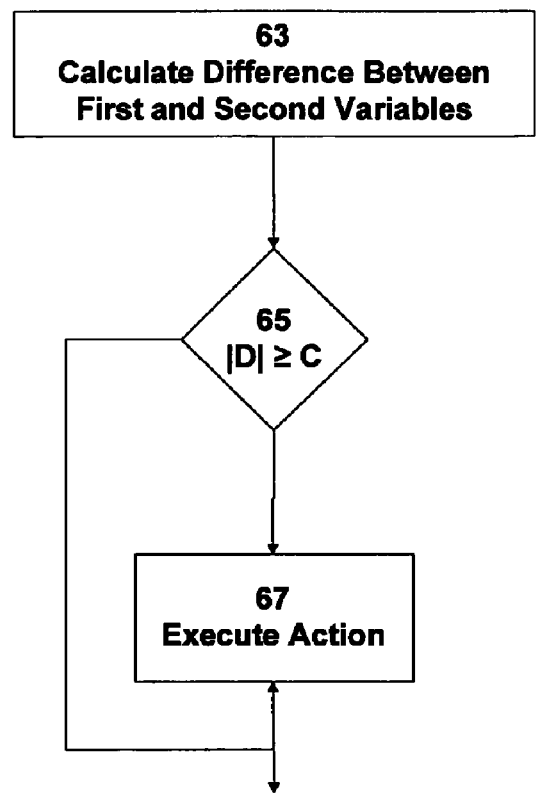
Figure 4:
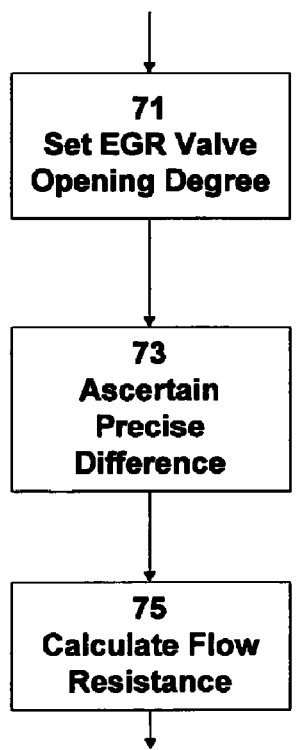

FIG. 1 shows a schematic illustration of an internal combustion engine having exhaust gas recirculation.
FIG. 2 shows a flow chart of a method for operating an internal combustion engine having exhaust gas recirculation.
FIG. 3 shows a detail of the flow chart from FIG. 2.
FIG. 4 shows a further detail of the flow chart from FIG. 2.

DETAILED DESCRIPTION OF THE INVENTION

FIG. 1 shows a schematic illustration of an internal combustion engine 1 of a motor vehicle (not shown) having exhaust gas recirculation. Internal combustion engine 1 has an intake manifold 3, which is closable via a final control element 5. Internal combustion engine 1 also has a combustion chamber 7, to which air (arrow 9) may be supplied via intake manifold 3. The exhaust gases (arrow 11) exiting from combustion chamber 7 are discharged via an exhaust pipe 13.

An exhaust gas recirculation channel (EGR channel) 15, which is closable with the aid of an exhaust gas recirculation valve unit (EGR valve unit) 17, leads back from exhaust pipe 13 to an area 18 of intake manifold 3 which lies between final control element 5 and combustion chamber 7. If EGR valve unit 17 is not completely closed, a mass flow (arrow 19) of a gas conducted from exhaust pipe 13 to area 18 results essentially as a function of the operating state of internal combustion engine 1.

Intake manifold 3 of internal combustion engine 1 has a temperature sensor 21 in area 18, which provides a variable $S_{T2}$ characterizing temperature $T_2$ of the gas in area 18. In addition, intake manifold 3 has a pressure sensor 23 in area 18, which provides a variable $S_{P2}$, which characterizes pressure $P_2$ of the gas located in area 18.

Furthermore, internal combustion engine 1 has a sensor 25 for determining a variable $S_{nmot}$, which characterizes speed nmot of internal combustion engine 1. According to the schematic illustration of FIG. 1, this sensor 25 is assigned to a crankshaft 27; however, variable $S_{nmot}$, which characterizes speed nmot of internal combustion engine 1, may also be detected with the aid of a sensor assigned to a camshaft or be detected or ascertained in another way. In addition, although only one combustion chamber 7 is shown in FIG. 1 for the sake of clarity, the method may also be used for internal combustion engines which have more than one combustion chamber. Different variants of the internal combustion engine result depending on the desired functional principle (for example, diesel engine or gasoline engine) of the internal combustion engine and as a function of the desired properties of the internal combustion engine. The internal combustion engine may thus have further components not shown in FIG. 1, such as a turbocharger or a particle filter. The method described in the following may be used for all of these variants of the internal combustion engine, however.

In the exemplary embodiment shown in the present case, EGR channel 15 has an EGR mass flow sensor 29, which provides a variable $S_{ms}$, from which a mass flow (arrow 19) of the gas conducted through EGR channel 15 is ascertained. It is further provided that a pressure sensor 31 situated in exhaust pipe 13 provides a variable $S_{P3}$, which characterizes pressure $P_3$ in exhaust pipe 13 and thus also at the intake of EGR channel 15. Finally, internal combustion engine 1 has a control and regulating unit 35, to which above-mentioned sensor variables $S_{T2}$, $S_{P2}$, $S_{P3}$, $S_{nmot}$, $S_{ms}$ are supplied via suitable transmission units. Control and regulating unit 35 may also set the degree of opening of final control element 5 and close final control element 5 with the aid of a manipulated variable $S_5$, which characterizes the degree of opening of final control element 5. Manipulated variable $S_5$ is supplied via a suitable transmission unit to an actuator 37 assigned to final control element 5, which actuates final control element 5.

Control and regulating unit 35 is a programmable control and regulating unit which has means 39, on which a program is stored, which performs the method according to the present invention. Means 39 for storing the program include semiconductor memories, but may also include storage media which are based on another storage principle, however.

The method performed by the program is executed in such a manner that as soon as internal combustion engine 1 is in overrun operation, in which no fuel is introduced into combustion chamber 7 and no torque is produced, it at least essentially closes final control element 5 by suitably setting manipulated variable $S_5$ and then, using variables T, p2, and nmot, which are detected and/or ascertained in this operating state, by employing the known pTn method (see, for example, published German patent document DE 10 2005 004 319), it ascertains a variable characterizing the mass flow (arrow 41) of the gas conducted through the combustion chamber. Because of closed final control element 5, the mass flow of the gas (arrow 9) conducted through intake manifold 3 is essentially at zero. The mass flow (arrow 41) of the gas conducted through combustion chamber 7 thus essentially corresponds to the mass flow (arrow 19) of the gas conducted through EGR channel 15. The variable ascertained using the pTn method thus characterizes the mass flow (arrow 19) of the gas conducted through EGR channel 15; it is also referred to as the "first variable." In the present case, it is assumed that the first variable is the mass flow (arrow 19) itself.

A mass flow is also ascertained from signal $S_{ms}$, also detected during the overrun operation with closed final control element 5, which is referred to as the "second variable." The second variable is compared to the first variable ascertained via the pTn method, so that any deviations may be recognized and stored in control and regulating unit 35. If the comparison between the first variable and the second variable indicates too large a difference, which is recognized by a comparison to a threshold value, an action may be executed; for example, a defect of EGR mass flow sensor 29 may be indicated.

In addition, a variable characterizing the flow resistance of EGR channel 15—such as the flow resistance itself—is ascertained using the ascertained first variable or detected second variable, which characterizes the mass flow (arrow 19) of the gas conducted through EGR channel 15, sensor variable $S_{P2}$, which characterizes pressure $P_2$ in area 18, and a variable $S_{P3}$, detected, for example, using sensor 31 situated in exhaust pipe 13, which characterizes pressure $P_3$ in exhaust pipe 13. For this purpose, EGR valve unit 17 is opened completely; however, another specific degree of opening of EGR valve unit 17 may also be set. Finally, the ascertained variable characterizing the flow resistance of EGR channel 15 is used to adapt the model of a model-based regulator of the air system. A controller of the EGR valve unit is adapted to the properties of the EGR channel, which change with increasing operating time of the internal combustion engine because of "sooting up," for example, in an exemplary embodiment which is not shown.

Individual method steps of a possible embodiment of the method according to the present invention are explained in greater detail with reference to FIGS. 2 through 4.

FIG. 2 shows the fundamental method steps. After a start in 51, it is cyclically checked in 53 whether internal combustion engine 1 is in overrun operation. If the answer in 53 is "yes," internal combustion engine 1 is thus in overrun operation, and the sequence continues with step 55. Otherwise, the check is repeated in 53. Depending on the construction of control and regulating unit 35, a method for establishing that internal combustion engine 1 is in overrun operation which deviates from the cyclic query may also be used. It may be further provided, in an embodiment which is not shown, that the sequence may not continue with step 55 every time that the internal combustion engine is in overrun operation. Specifically, it is entirely sufficient in many applications to perform step 55 and the following method steps only once per driving cycle.

In 55, manipulated variable $S_5$ is set to a value which corresponds to the closed position of final control element 5. This causes final control element 5 to close intake channel 3. In subsequent execution step 57, the first variable characterizing the EGR mass flow is ascertained, using sensor variables $S_{T2}$, $SP_2$, and $S_{nmot}$, which characterize temperature $T_2$ and pressure $P_2$ of the gas located in area 18, as well as engine speed nmot, respectively, and employing the known pTn method. In an embodiment which is not shown, however, a method different from the pTn method may also be used, for example an expansion of the pTn method, which uses other or additional variables.

Subsequent execution step 59 compares the first variable to the second variable, which was provided using EGR mass flow sensor 29. Deviations of the second variable from the first variable are recognized and stored in control and regulating unit 35. To ascertain the deviation, a difference between the two variables is calculated. Subsequent execution step 61 includes triggering an action for the case in which the absolute value of the difference between the first variable and the second variable reaches or exceeds a threshold value.

The precise sequence in execution step 61 is shown in FIG. 3. Firstly, in execution step 63, difference D between the first "ascertained" variable and the second "detected" variable is calculated. Subsequently, it is checked in execution step 65 whether the absolute value of difference D reaches or exceeds threshold value c. If so, action 67 is executed. Otherwise, action 67 is not executed.

Action 67 may include various operations. For example, a defect in EGR mass flow sensor 29 may be concluded if threshold value c is reached or exceeded. This defect may be indicated to the driver of the motor vehicle in a suitable manner. Furthermore, internal combustion engine 1 may be shifted to a safe operating state, for example, in that it is operated at reduced power and/or speed or internal combustion engine 1 is turned off. Action 67 may include an arbitrary selection or combination of the above-mentioned operations and still further operations which represent a suitable response to reaching or exceeding threshold value c.

It may be seen in FIG. 2 that execution step 69, which includes the ascertainment of the variable characterizing the flow resistance of EGR channel 15 and is shown in detail in FIG. 4, follows execution step 61. Firstly, the degree of opening of EGR valve unit 17 is set to a specific value in execution step 71. Depending on the implementation of the present invention, the instantaneous degree of opening of EGR valve unit 17 resulting from the operating state of the internal combustion engine may be maintained or a value deviating therefrom may be set. It is particularly favorable to open EGR valve unit 17 completely. The setting of EGR valve unit 17 in execution step 71 is followed by execution step 73, which includes ascertaining the difference of pressure $P_3$ at exhaust pipe 13 and pressure $P_3$ in area 18.

Pressure $P_3$ in exhaust pipe 13 is detected and/or ascertained on the basis of sensor 31. Alternatively thereto, the pressure in exhaust pipe 13 may be estimated from the atmospheric pressure or the pressure before a particle filter (not shown), because no pressure drop occurs via a possibly provided turbine and the exhaust system at negligible mass flow. Using the pressure difference ascertained in 73, the variable which characterizes the flow resistance of EGR channel 15 at the set degree of opening of EGR valve unit 17 is ascertained. This variable is stored in the control and regulating unit. In addition, it may be provided that various variables characterizing the corresponding flow resistance of EGR channel 15 may be stored for the various degrees of opening of EGR valve unit 17 set in execution step 71.

FIG. 2 shows that execution step 69 is followed by a last execution step 77, which includes the adaptation of a model-based regulator and/or a controller of an air system of internal combustion engine 1, which includes final control element 5 and intake manifold 3, and/or the adaptation of a controller of EGR valve unit 17 using the variable characterizing the flow resistance of EGR channel 15.

What is claimed is:

1. A method for operating an internal combustion engine having exhaust gas recirculation, the method comprising:

supplying air to at least one combustion chamber via an intake manifold configured to be at least partially closable with the aid of a final control element;

routing a portion of an exhaust gas flowing in an exhaust pipe into an area of an intake manifold positioned between the final control element and the at least one combustion chamber, wherein the portion of the exhaust gas is routed through an EGR channel configured to be at least partially closable with the aid of an EGR valve unit;

ascertaining a first variable characterizing a mass flow of the exhaust gas routed through the EGR channel from a set of state variables of the internal combustion engine corresponding to an operating state in which the internal combustion engine is in overrun operation and the final control element is at least substantially closed, wherein the set of state variables includes a speed of the internal combustion engine, and a gas temperature and a pressure in the intake manifold between the final control element and the at least one combustion chamber;

detecting, in the operating state in which the internal combustion engine is in overrun operation, a second variable characterizing the mass flow of the exhaust gas routed through the EGR channel, wherein the second variable is detected using a sensor;

comparing the first variable being ascertained in overrun operation and the second variable being detected in overrun operation to one another; and correcting, based on the comparison between the first variable being ascertained in overrun operation and the second variable being detected in overrun operation, the variables being detected by the sensor in every operating state of the internal combustion engine.

2. The method as recited in claim 1, wherein the EGR valve unit is set to have a specified degree of opening to ascertain the variable characterizing the flow resistance of the EGR channel.

3. The method as recited in claim 2, wherein the variable characterizing the flow resistance of the EGR channel is ascertained repeatedly at different degrees of opening of the EGR valve unit.

4. The method as recited in claim 2, wherein the pressure in the exhaust pipe is one of: a) estimated on the basis of the atmospheric pressure; or b) detected on the basis of a pressure sensor situated in the exhaust pipe.

5. The method as recited in claim 1, further comprising:

determining the variable characterizing the flow resistance of the EGR channel repeatedly at different degrees of opening of the EGR valve unit, and wherein the pressure in the exhaust pipe is one of (a) estimated on the basis of the atmospheric pressure, and (b) detected based on a pressure sensor situated in the exhaust pipe.

6. A control unit for controlling operation of an internal combustion engine having exhaust gas recirculation, comprising:

a controller to control a supply of air to at least one combustion chamber via an intake manifold configured to be at least partially closable with the aid of a final control element, wherein a portion of an exhaust gas flowing in an exhaust pipe is routed into an area of an intake manifold positioned between the final control element and the at least one combustion chamber, wherein the portion of the exhaust gas is routed through an EGR channel configured to be at least partially closable with the aid of an EGR valve unit;

an ascertaining arrangement to ascertain a first variable characterizing a mass flow of the exhaust gas routed through the EGR channel, wherein the first variable is ascertained from a set of state variables of the internal combustion engine corresponding to an operating state in which the internal combustion engine is in overrun operation and the final control element is at least substantially closed, wherein the set of state variables includes a speed of the internal combustion engine, and a gas temperature and a pressure in the intake manifold between the final control element and the at least one combustion chamber;

a sensor to detect, in the operating state in which the internal combustion engine is in overrun operation, a second variable characterizing the mass flow of the exhaust gas routed through the EGR channel;

a comparator to compare the first variable being ascertained in overrun operation and the second variable being detected in overrun operation to one another;

a correcting arrangement to correct, based on the comparison between the first variable being ascertained in overrun operation and the second variable being detected in overrun operation, the variables being detected by the sensor in every operating state of the internal combustion engine;

an arrangement to trigger an action if an absolute value of the difference is as at least a threshold value, and if the absolute difference is at least the threshold value, performing an action, which includes at least one of (i) determining that there is a defect in the sensor, and (ii) shifting the internal combustion engine to a safe operating state, which includes one of operating the engine at reduced power, reduced speed, and shutting the engine off;

a pressure difference ascertaining arrangement to ascertain a pressure difference between a first pressure at an exhaust pipe and a second pressure in an intake manifold in an area of the intake manifold positioned between the final control element and the at least one combustion chamber;

a setting arrangement to set the EGR valve unit to have a specified degree of opening to determine the variable characterizing the flow resistance of the EGR channel based on the pressure difference;

a flow resistance variable ascertaining arrangement to ascertain a flow resistance variable which characterizes a flow resistance of the EGR channel at the set degree of opening of the EGR valve unit; and a storing arrangement to store the flow resistance variable in the control unit.

7. The control unit as recited in claim 6, wherein the second variable is corrected based on the first variable to compensate for age-related drift in the sensor.

8. The control unit as recited in claim 6, wherein the variable characterizing the flow resistance of the EGR channel is ascertained repeatedly at different degrees of opening of the EGR valve unit.

9. The control unit as recited in claim 6, wherein the pressure in the exhaust pipe is one of (a) estimated on the basis of the atmospheric pressure, and (b) detected based on a pressure sensor situated in the exhaust pipe.

10. The control unit as recited in claim 6, further comprising:

an adaptor to adapt, by using the variable characterizing the flow resistance of the EGR channel, at least one of (a) at least one parameter of a model of a model-based controller of an air system of the internal combustion engine, and (b) at least one parameter of a controller of the EGR valve unit.

11. A control unit for controlling operation of an internal combustion engine having exhaust gas recirculation, comprising:
- a controller to control a supply of air to at least one combustion chamber via an intake manifold configured to be at least partially closable with the aid of a final control element, wherein a portion of an exhaust gas flowing in an exhaust pipe is routed into an area of an intake manifold positioned between the final control element and the at least one combustion chamber, wherein the portion of the exhaust gas is routed through an EGR channel configured to be at least partially closable with the aid of an EGR valve unit;
- an ascertaining arrangement to ascertain a first variable characterizing a mass flow of the exhaust gas routed through the EGR channel, wherein the first variable is ascertained from a set of state variables of the internal combustion engine corresponding to an operating state in which the internal combustion engine is in overrun operation and the final control element is at least substantially closed, wherein the set of state variables includes a speed of the internal combustion engine, and a gas temperature and a pressure in the intake manifold between the final control element and the at least one combustion chamber;
- a sensor to detect, in the operating state in which the internal combustion engine is in overrun operation, a second variable characterizing the mass flow of the exhaust gas routed through the EGR channel;
- a comparator to compare the first variable being ascertained in overrun operation and the second variable being detected in overrun operation to one another;
- a correcting arrangement to correct, based on the comparison between the first variable being ascertained in overrun operation and the second variable being detected in overrun operation, the variables being detected by the sensor in every operating state of the internal combustion engine;
- an arrangement to trigger an action if an absolute value of the difference is as at least a threshold value, and if the absolute difference is at least the threshold value, performing an action, which includes at least one of (i) determining that there is a defect in the sensor, and (ii) shifting the internal combustion engine to a safe operating state, which includes one of operating the engine at reduced power, reduced speed, and shutting the engine off;
- a pressure difference ascertaining arrangement to ascertain a pressure difference between a first pressure at an exhaust pipe and a second pressure in an intake manifold in an area of the intake manifold positioned between the final control element and the at least one combustion chamber;
- a setting arrangement to set the EGR valve unit to have a specified degree of opening to determine the variable characterizing the flow resistance of the EGR channel based on the pressure difference;
- a flow resistance variable ascertaining arrangement to ascertain a flow resistance variable which characterizes a flow resistance of the EGR channel at the set degree of opening of the EGR valve unit; and
- a storing arrangement to store the flow resistance variable in the control unit;
- wherein the variable characterizing the flow resistance of the EGR channel is ascertained repeatedly at different degrees of opening of the EGR valve unit, and wherein the pressure in the exhaust pipe is one of (a) estimated on the basis of the atmospheric pressure, and (b) detected based on a pressure sensor situated in the exhaust pipe.

12. The control unit as recited in claim 11, further comprising:
- an adaptor to adapt, by using the variable characterizing the flow resistance of the EGR channel, at least one of (a) at least one parameter of a model of a model-based controller of an air system of the internal combustion engine, and (b) at least one parameter of a controller of the EGR valve unit.

* * * * *